Sept. 18, 1945.　　　C. S. SELTZER ET AL　　　2,385,109
WELDING APPARATUS
Filed Oct. 11, 1941　　　12 Sheets-Sheet 4
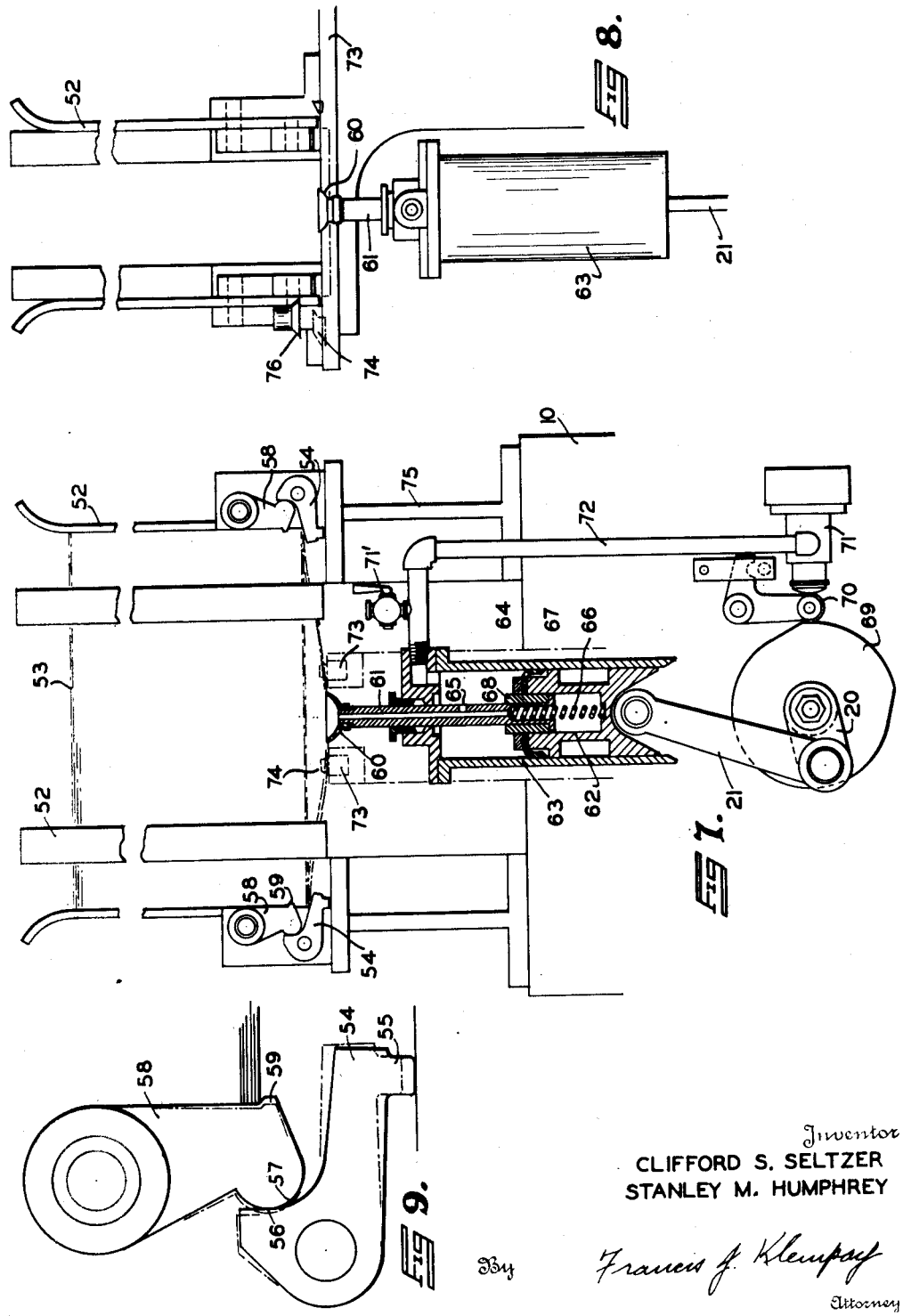
Inventor
CLIFFORD S. SELTZER
STANLEY M. HUMPHREY
By Francis J. Klempay
Attorney

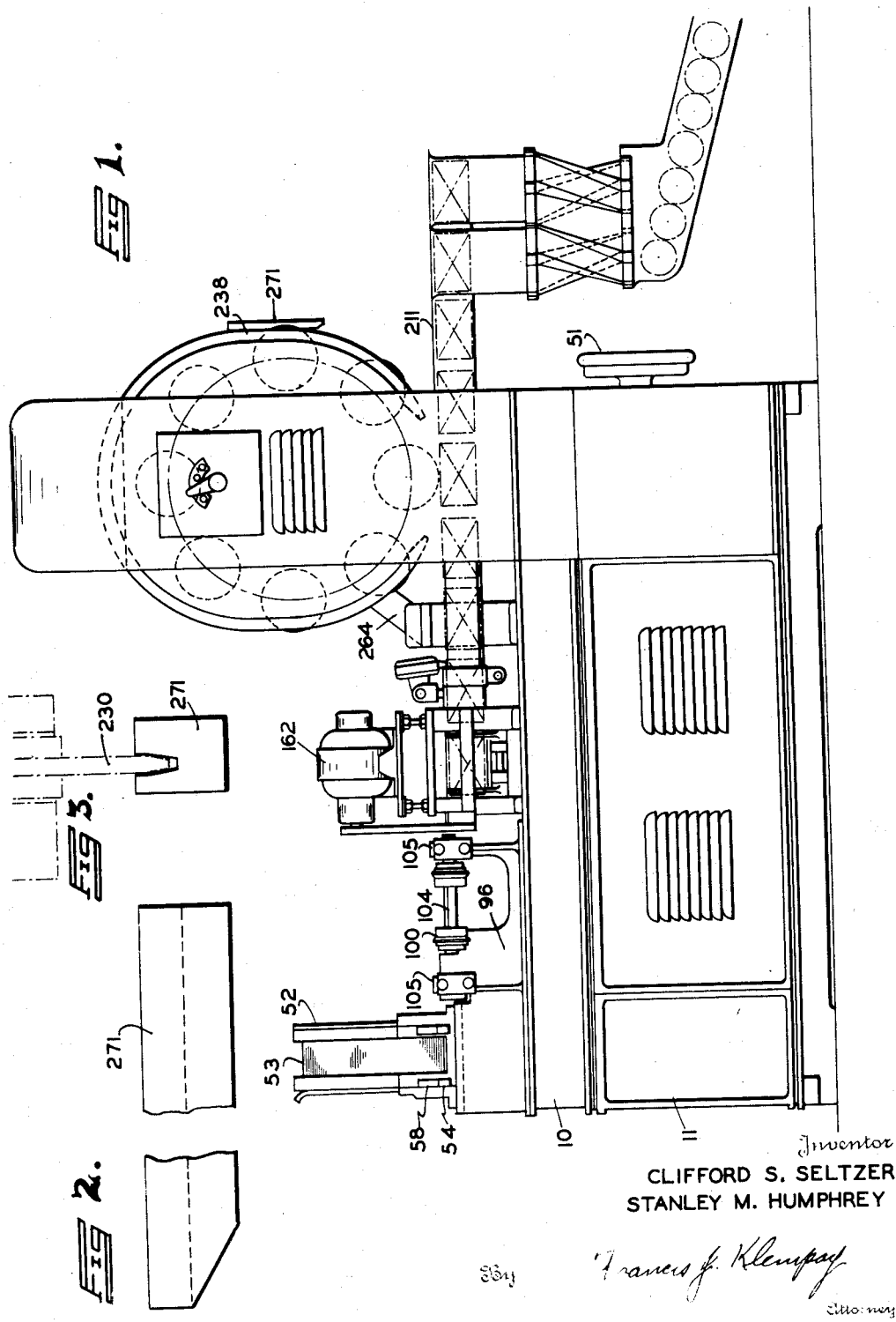

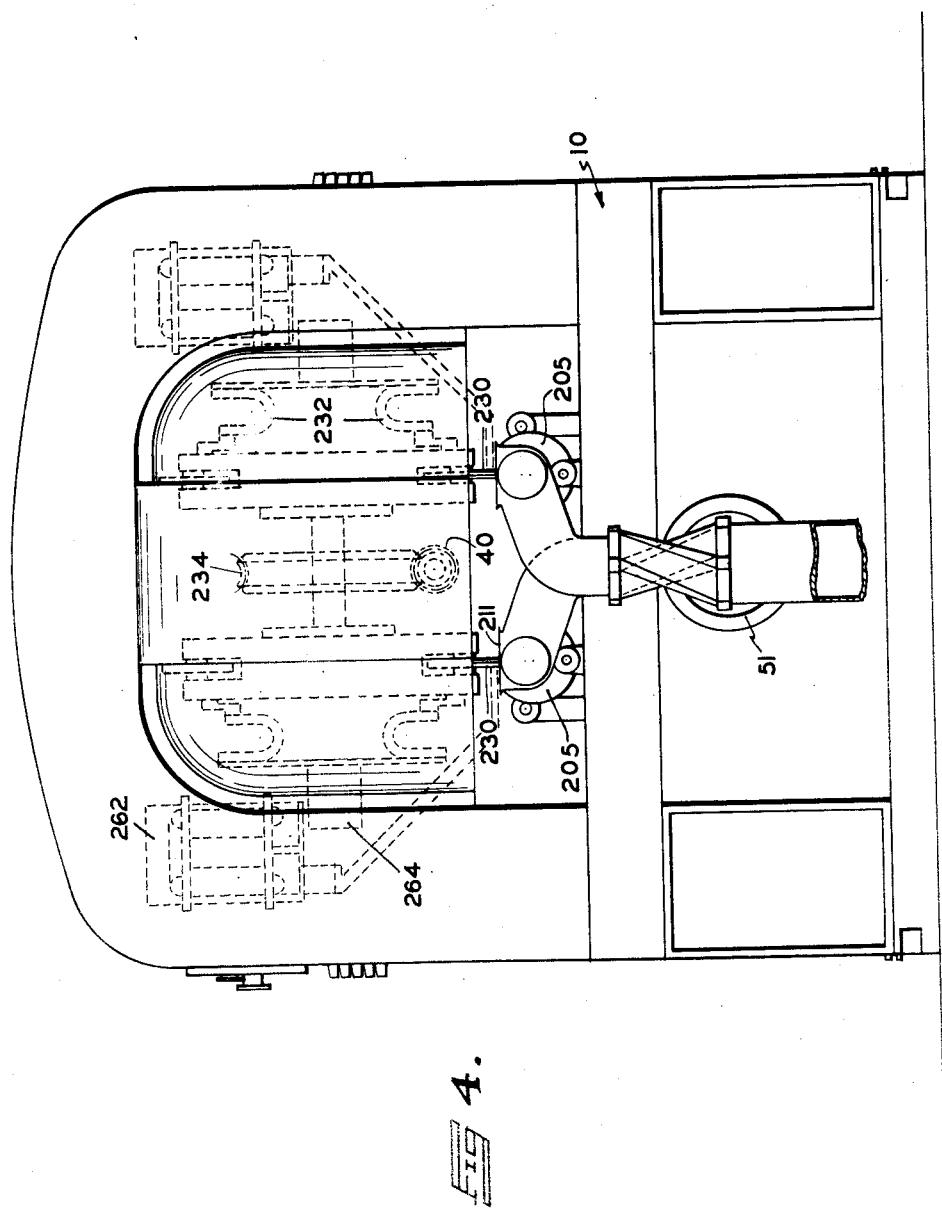

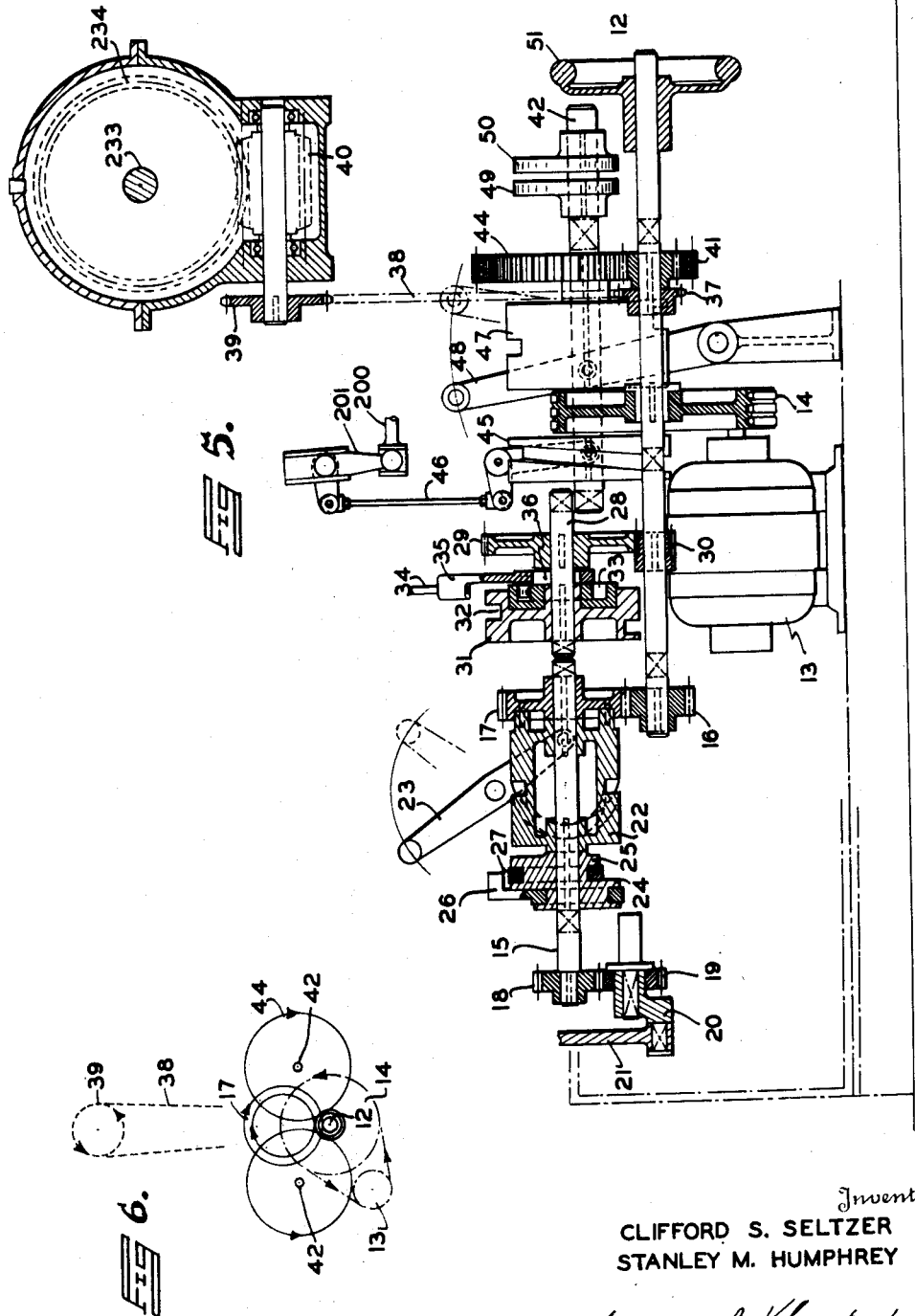

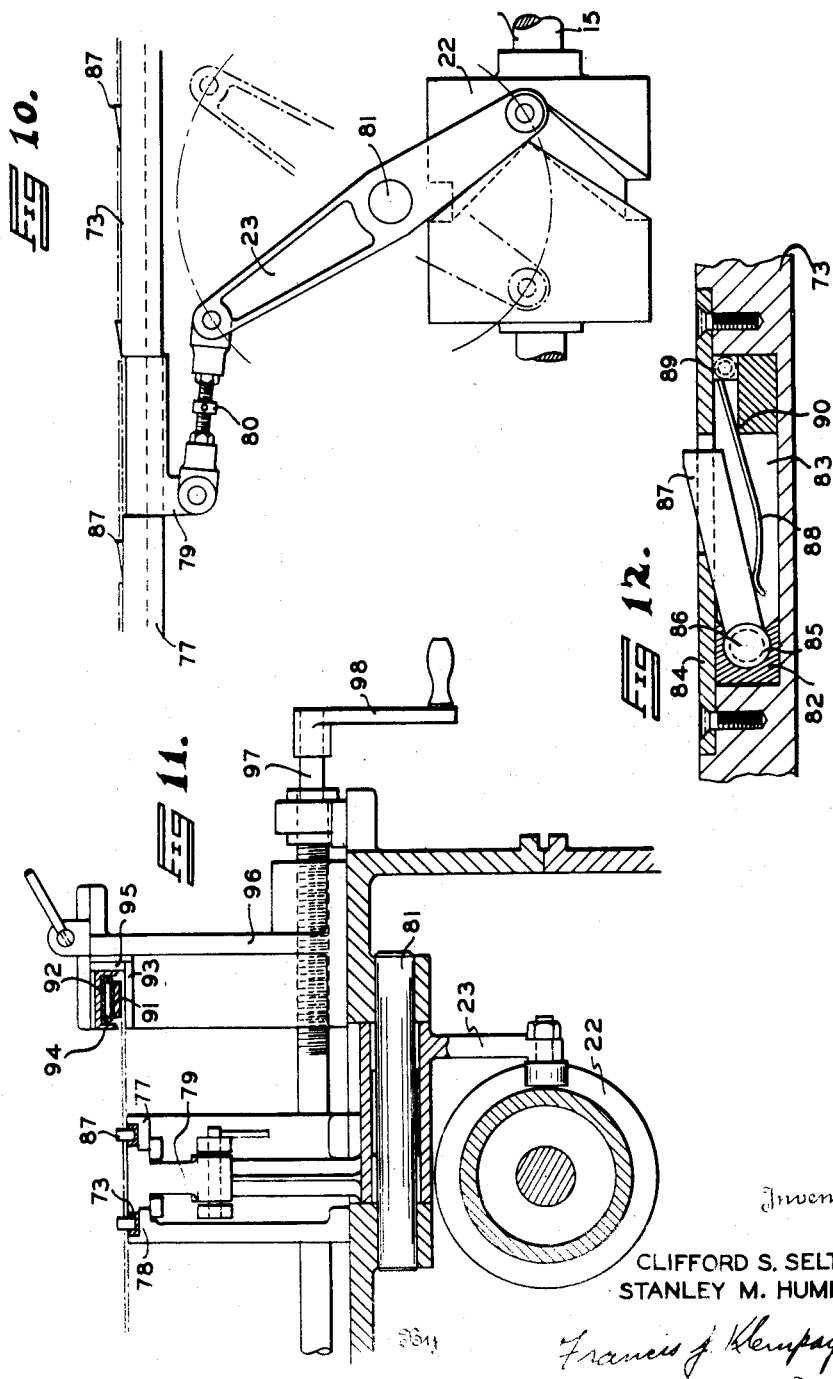

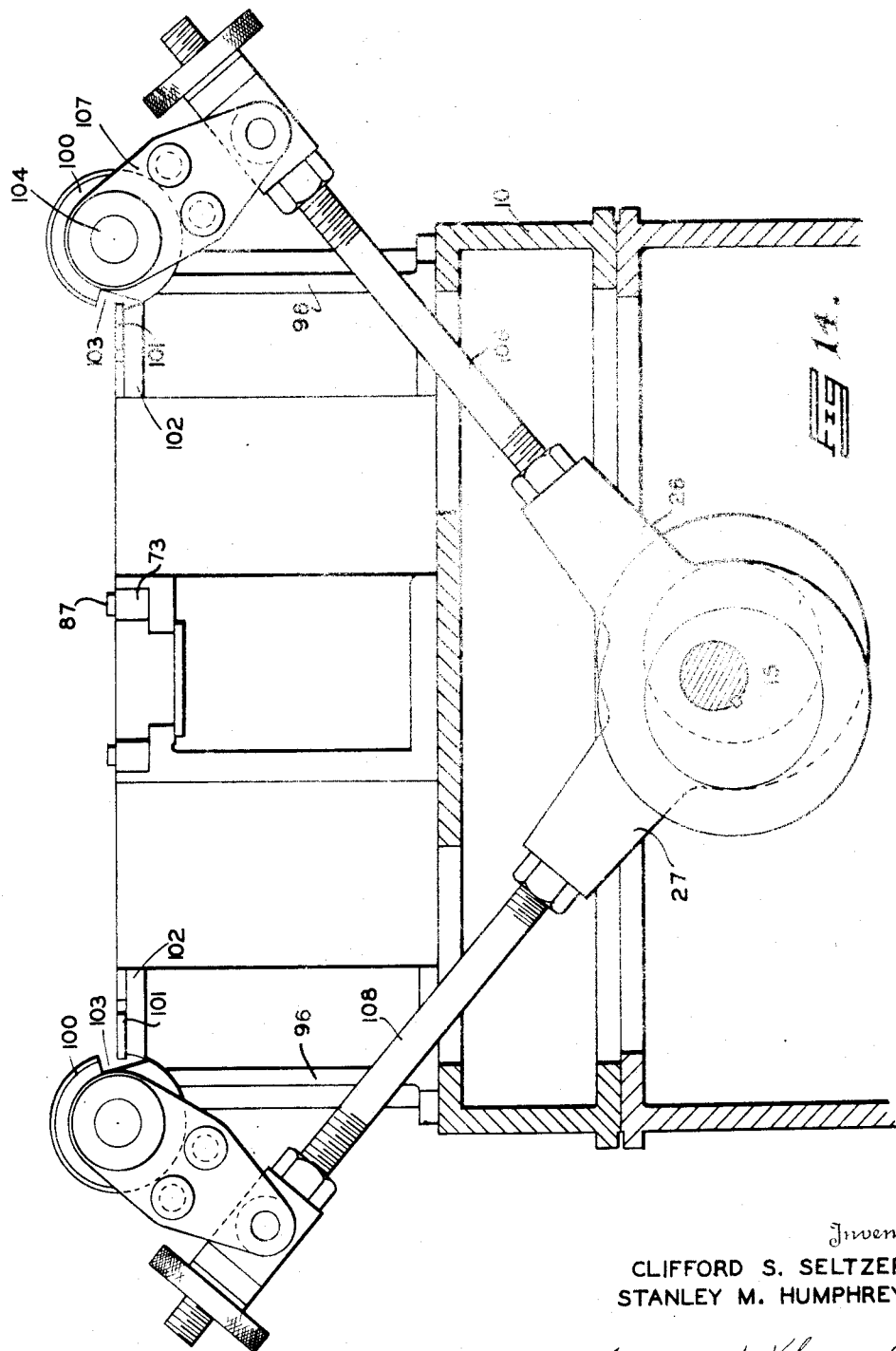

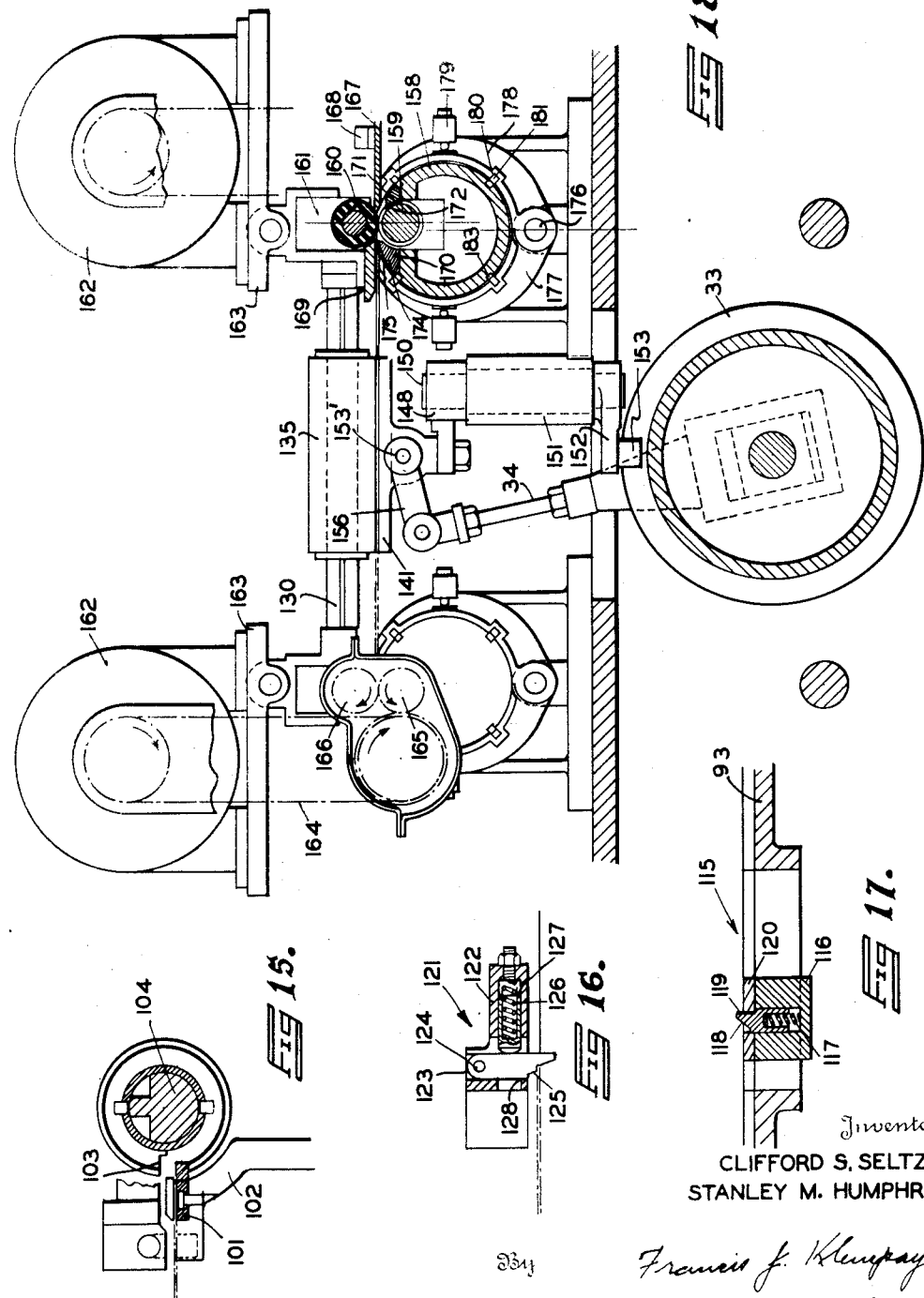

Sept. 18, 1945.  C. S. SELTZER ET AL  2,385,109
WELDING APPARATUS
Filed Oct. 11, 1941   12 Sheets-Sheet 9
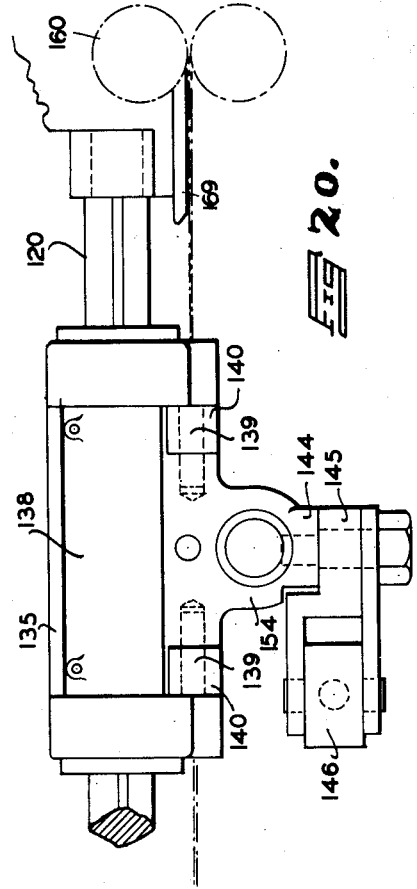
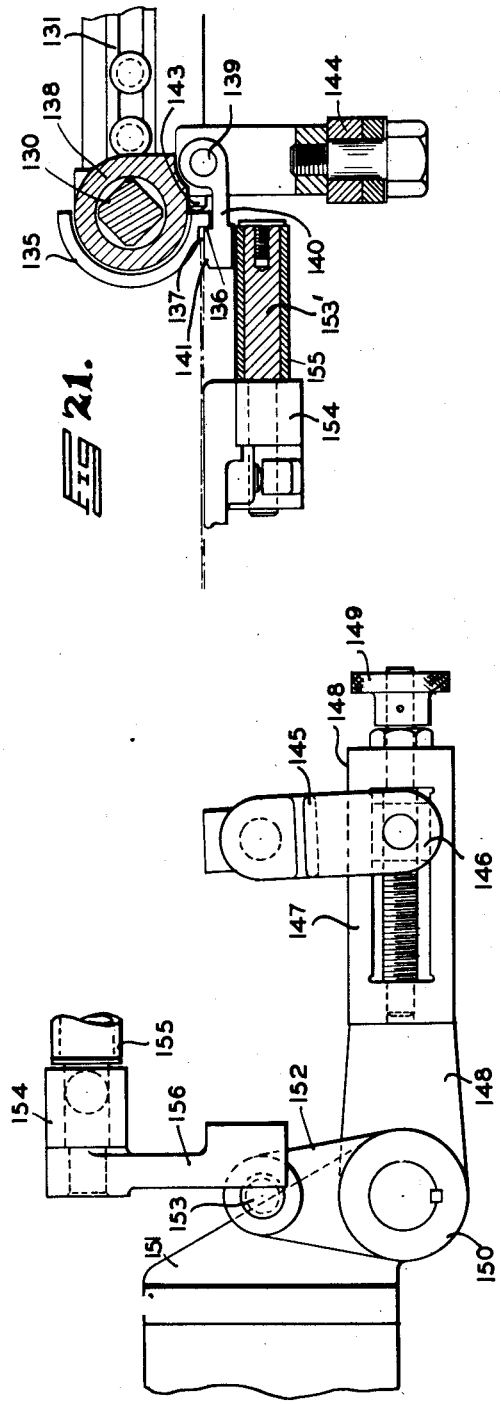
Inventor
CLIFFORD S. SELTZER
STANLEY M. HUMPHREY
By Francis J. Klempay
Attorney

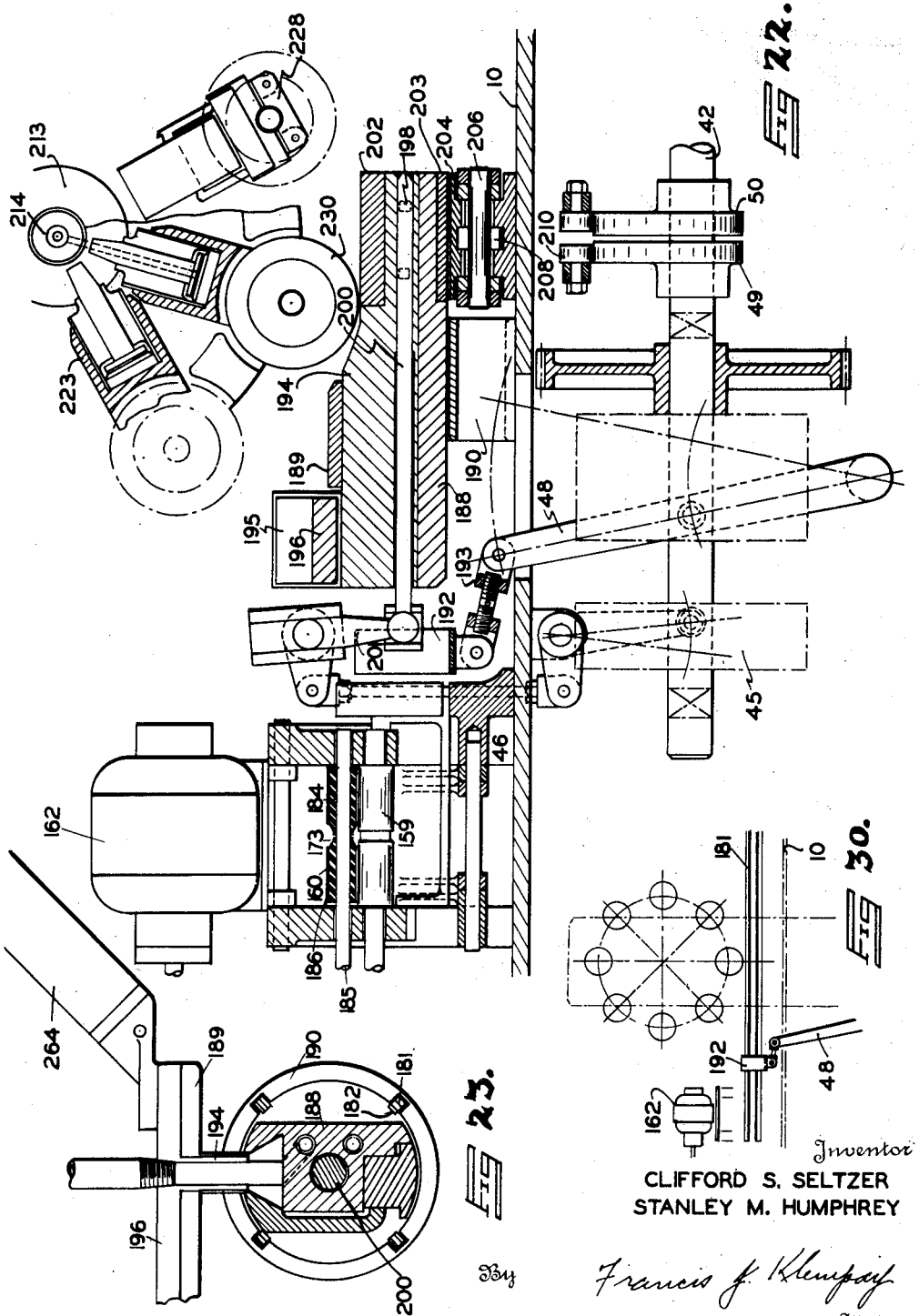

Sept. 18, 1945.  C. S. SELTZER ET AL  2,385,109
WELDING APPARATUS
Filed Oct. 11, 1941  12 Sheets-Sheet 11
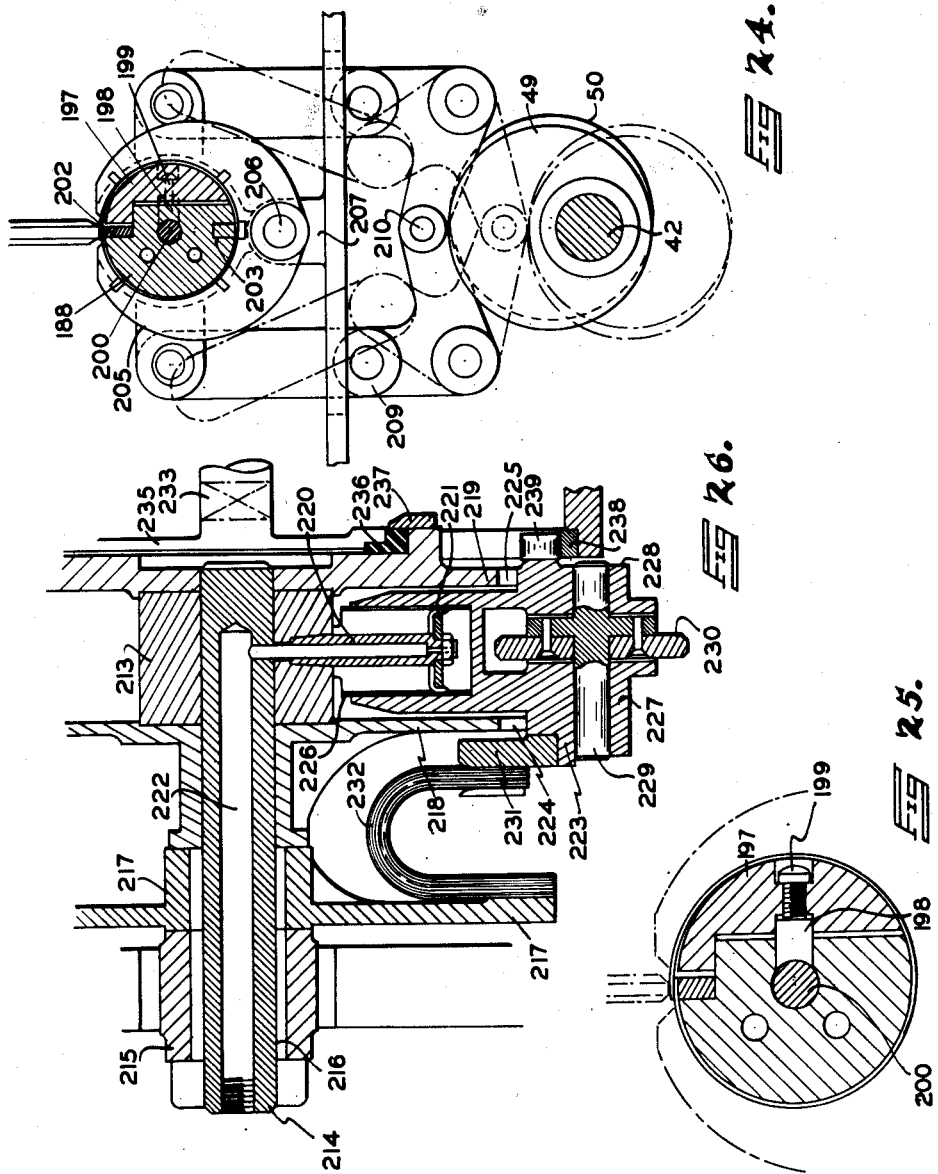
Inventor
CLIFFORD S. SELTZER
STANLEY M. HUMPHREY
By Francis J. Klempay
Attorney

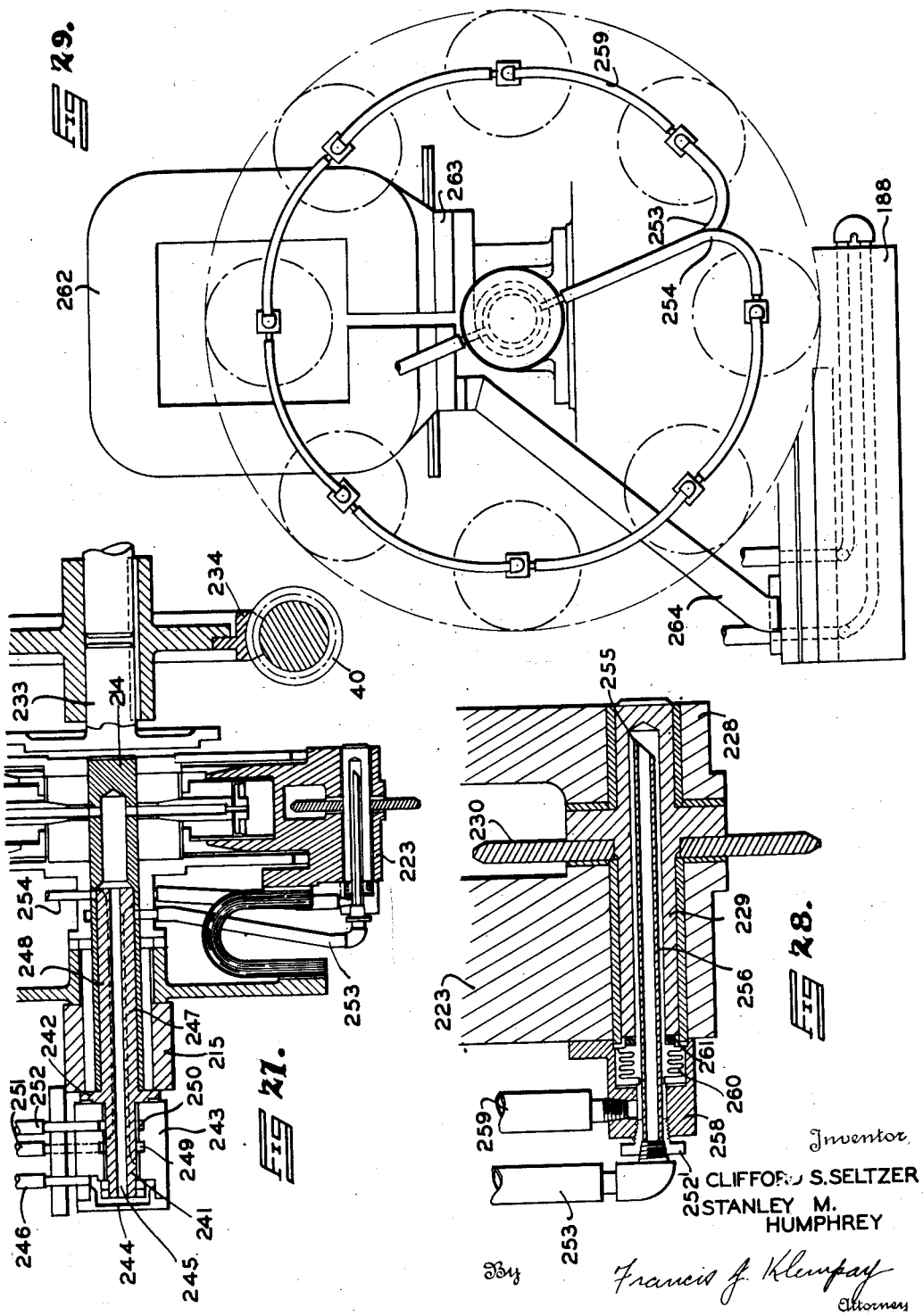

Patented Sept. 18, 1945

2,385,109

UNITED STATES PATENT OFFICE 2,385,109

WELDING APPARATUS

Clifford S. Seltzer and Stanley M. Humphrey, Warren, Ohio, assignors to The Taylor-Winfield Corporation, Warren, Ohio, a corporation of Ohio Application October 11, 1941, Serial No. 414,624

19 Claims. (Cl. 219—6)

This invention relates to welding apparatus and more particularly to an automatic machine for producing sheet metal cylinders at high productive speeds. The product may be utilized as bodies of cylindrical metal containers or for other purposes and the surfaces of the flat stock making up the article may be lithographed, coated, or otherwise decorated. The invention, in its broader aspects, combines certain desirable features of the can making and welding arts in a compact unitary machine for automatically producing sheet metal cylindrical bodies at high productive speeds, which machine, in its operation and resulting characteristics, possesses certain substantial advantages as will hereinafter become apparent.

A principal object of the invention is the provision of an automatic machine for producing sheet metal cylindrical bodies which is operative to produce such bodies of good quality from more economical and less stock than that heretofore employed for the purpose. Also, the invention seeks to materially reduce the number of rejectable bodies formed in machines of this general character and to further materially reduce the number of rejectable completed containers whose failure becomes apparent upon the subsequent application of the container ends or covers.

A more specific object of the invention is the provision of an automatic machine for securing together the overlapped edges of the formed blanks to complete the fabrication of the cylindrical bodies. The improvement involves an electric resistance welding apparatus of special construction which is operative to produce an accurate seam weld of uniform density throughout the length of the body as results from the application of substantially uniform welding current and pressure and substantially uniform rectilinear speed of the welding wheel throughout the length of the body. This is accomplished without the use of reciprocating parts in the welding apparatus and involves other novel and meritorious features of construction and operation of the welding apparatus as will more fully appear hereinafter.

Yet another object of the invention is the provision of an improved apparatus for welding the contiguous edges of a cylindrically formed sheet of metal which is intermittently moved along its longitudinal axis in the production of cylindrical metal bodies at high speeds. The apparatus effects the weld with a minimum of excess stock and provides a homogeneous and uninterrupted weld of improved strength and tightness thereby contributing to the strength of the finished article and eliminating the possibility of any leaks when the finished article is a container. This is accomplished in accordance with the preferred embodiment of the invention by guiding the pre-formed blank over and about a current carrying horn which forms one operative terminal of the welding transformer secondary or other source of welding current. A movable electrode wheel of improved construction and mounting engages the outer surface of the overlapped stock edges to effect the weld. The horn is provided with inherent means to align the seam edges with respect to the welding station and to automatically gauge the inside diameter of the cylinder being formed preparatory to the welding operation as well as with means to conduct the flow of a liquid coolant therethrough. Associated with the horn and positioned about its outer periphery are means to move the formed blank progressively toward the welding station and off the horn upon completion of the welding cycle, means to frictionally retain the formed blank in its proper circumferential position at the welding station or after the formed blank leaves the contiguous edge guiding device, and means to clamp the formed stock about the horn and against the gauging device at the welding station after the actuation of the above mentioned friction means and in such manner that the contiguous edges are overlapped in proper manner and without damage thereto.

These and other objects and advantages of the invention will become apparent from a consideration of the following detailed specification and the accompanying drawings wherein there is specifically disclosed a preferred embodiment of the invention.

In the drawings:

Figure 1 is a side view of an assembled machine constructed in accordance with the principles of the invention;

Figures 2 and 3 are side and end views, respectively, of an electrode wheel sizing bar utilized in the machine of Figure 1;

Figure 4 is an end view of the apparatus of Figure 1;

Figure 5 is a fragmentary longitudinal section of the mechanical drive assembly of the machine of Figure 1;

Figure 6 is a schematic representation of the driving shafts interconnections as the same appears from an end of the machine;

Figure 7 is an end view, partly in section, of the blank stacking and primary feeding mechanism of the machine;

Figure 8 is a side view of a portion of the mechanism of Figure 5;

Figure 9 is an enlarged view of the lever arrangement employed to maintain a constant pressure on the lowermost blank in the stack;

Figures 10, 11 and 12 are detailed views of the means employed to advance the blanks longitudinally through the machine in step by step progression;

Figure 14 is a transverse section throughout the machine, showing the arrangement and drive of the blank notching mechanism;

Figure 15 is a section through a cutter carrying shaft of Figure 11;

Figures 16 and 17 are detailed views of a yieldable abutment and a back stop, respectively, utilized in the machine;

Figure 18 is a transverse section through the apparatus of Figure 1;

Figures 19, 20 and 21 are detailed views of the cross feed driving, gauging and clamping assemblies utilized in the apparatus of Figure 1;

Figure 22 is a longitudinal section through one of the forming and welding horn assemblies;

Figure 23 is a transverse section through the welding horn at substantially intermediate its ends;

Figure 24 is a transverse section of the welding horn at the welding station thereof and showing the mechanism employed to clamp the formed blank about the horn;

Figure 25 is an enlarged transverse section of the welding horn at the welding station;

Figure 26 is a longitudinal section through one of the welding wheel assemblies;

Figure 27 is a view similar to Figure 23 but showing the air and water connections more in detail;

Figure 28 is an enlarged sectional view through one of the individual welding wheel supports;

Figure 29 is a schematic side view of one of the welding wheel assemblies to illustrate the cooling water circuits; and Figure 30 is a fragmentary side view of the carrier bars utilized to transport the blanks from the forming stations to the welding stations and beyond.

Figure 13:
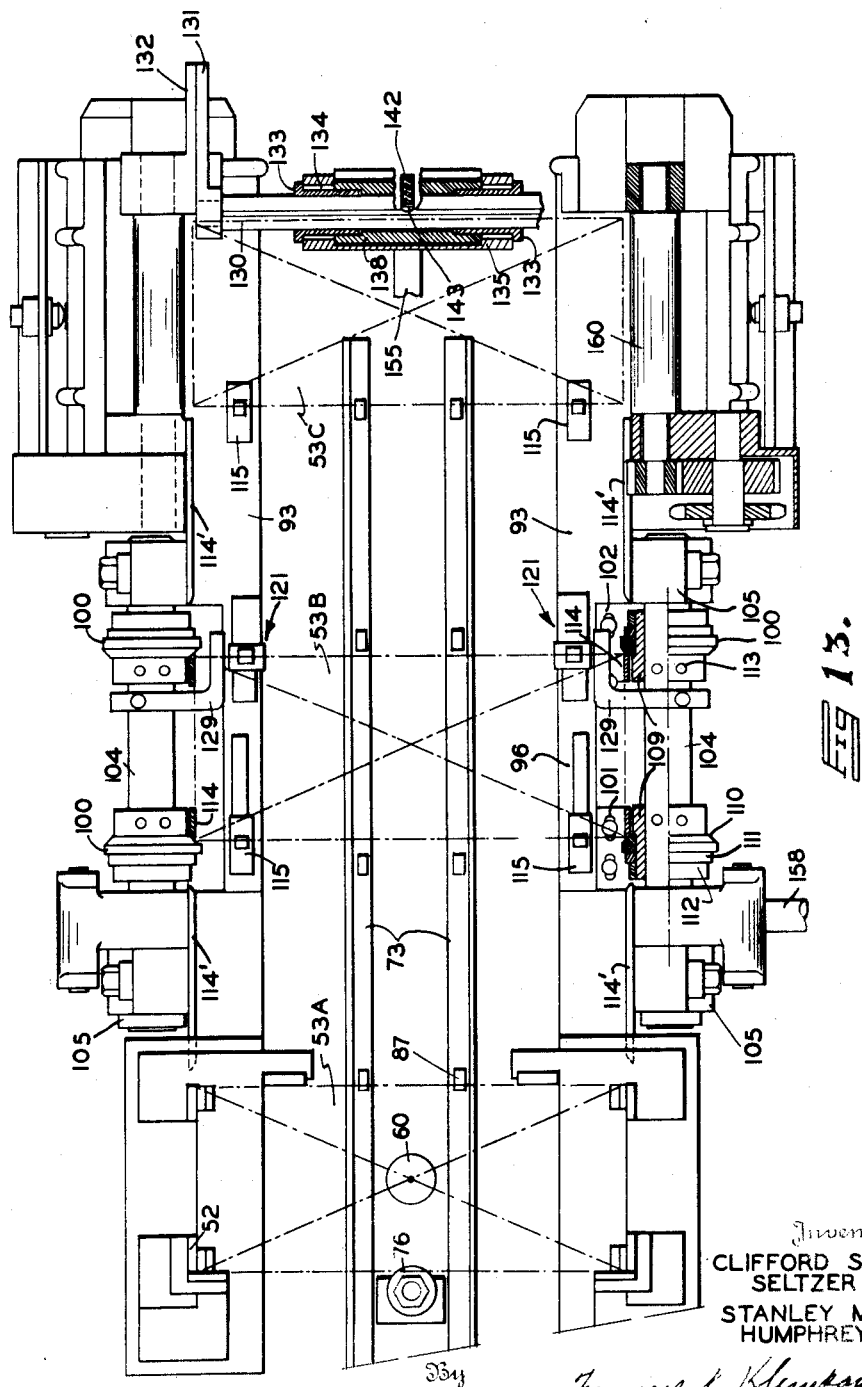
Figure 13 is a plan view of a portion of the machine, some parts being shown in section.

The apparatus of the invention in its illustrated and preferred embodiment consists of an integrated and self-contained assembly which is automatically operative to convert flat sheet metal blanks into cylindrical bodies lap welded along their overlapped edges. As such, the apparatus includes a stack for storing a supply of the blanks including means to withdraw the blanks one at a time from the stack, means to move the individual blanks from the vicinity of the stack to the successive working stations of the machine in an intermittent progressive movement, a notching station for removing the four corners of each separate blank, two forming roll stations for forming the flat blanks into cylindrical blanks, a cross feed for gauging, clamping and moving the blanks to the roll stations alternately; a welding station including a current conducting supporting and gauging horn, as above mentioned, and a welding wheel assembly associated with each of said forming roll stations; and means associated with each of said forming and welding assemblies to move the formed blank from the forming to the welding station progressively. As will appear more clearly hereinafter, all of these various parts are supported immediately on a frame 10 which in turn is supported on a base 11. The latter conveniently houses the driving and synchronizing apparatus for substantially all of the moving parts of the machine, this apparatus being shown in detail in Figure 5 of the drawings. Referring now to this figure, reference numeral 12 designates a shaft which operates all the moving parts of the machine which require synchronization and is in turn driven by a motor 13 through pulley 14. Shaft 12 is coupled with a countershaft 15 through reduction gears 16 and 17 which drive shaft 15 at half speed. To the outer end of shaft 15 is keyed a gear 18 which through meshing gear 19 drives a crank 20. A connecting rod 21 for operating the sheet separating mechanism of the stack, in a manner to be more clearly described below, is connected to the crank 20. A cam 22 for oscillating a pivoted arm 23 is provided for the purpose of reciprocating certain sheet feeding bars which will be described below. Also keyed on the shaft 15 are two angularly spaced cams 24 and 25, the followers 26 and 27 of which are arranged to operate the blank-notching mechanism in a manner to be hereinafter described.

A second countershaft 28 is driven from shaft 12 through reduction gears 29 and 30 at one-fourth the speed of shaft 12. Keyed to shaft 28 is a collar 31 having a peripheral groove cam 32, the follower of which operates the cross feed mechanism, in the manner to be described below, for the purpose of feeding the blanks to alternate forming roll stations. Collar 31 is also provided with an axially extending groove cam 33, the follower of which oscillates rod 34 for the purpose of operating the stock clamp used in the cross feed mechanism. Rod 34 is attached to a yoke 35 which carries the cam follower engaging the groove 33 and has sliding connection with a bearing block 36 which is mounted on the shaft 28, the whole assembly providing for pivotal movement of member 35 about the axis of shaft 28 and at the same time rectilinear movement of the yoke radially in a manner well understood in the art.

Shaft 12 drives the welding wheel assembly through sprocket 37, chain 38, sprocket 39 and worm drive 40. Also driven from shaft 12 through gear 41 are two spaced parallel countershafts 42 positioned on either side of the machine. One such shaft is provided for each of the two forming and welding assemblies of the apparatus. Each shaft 42 is driven from gear 41 by a gear 44 at one-fourth the speed of main shaft 12. Inasmuch as the two forming and welding assemblies and the component parts such as, for example, horns, drives and gauging and moving mechanisms are identical, but one such assembly will be described in detail. A cam 45 is keyed to shaft 42 and operates rod 46 for the purpose of operating the expanding gauge block incorporated in the welding horn to properly size the cylinder body at the welding station. A second cam 47 is keyed to shaft 42 and rocks arm 48 which operates the feeding bars for transporting the formed blanks from the forming roll station to and through the welding station. Also keyed on shaft 42 are cams 49 and 50, the functions, of which are to clamp the formed metal blank to and about the welding horn in a manner to be hereinafter described. To facilitate adjustment of the machine, a hand wheel 51 is keyed onto main shaft 12 whereby the machine may be manually operated.

Blank stacking and primary feeding mechanism

Referring now to Figure 7, reference numeral 52 designates stakes which extend vertically on opposite sides of a rectangle to receive and guide a stack 53 of flat sheet blanks. As the first blanks are loaded, they rest at their ends upon balanced levers 54, two of which are positioned at either end of the stack. As shown in Figure 9, each of the levers 54 is provided with a downwardly extending projection 55 to limit its downward movement and with a leg 56 to engage a rounded surface 57 of a check lever 58. The lower inner edge of each lever 58 is provided with a toe 59 to engage the end edges of the blanks and prevent the downward movement of the stack of blanks thereabove when the levers 58 are moved to inner positions. Levers 54 and 58 are mounted on anti-friction bearings and operate in such manner that the pressure exerted on the end edges of the lowermost blanks in the stack is at all times substantially uniform, being determined by the weight of the blanks intermediate the supporting surfaces of the levers 54 and the toes 59 since it should be apparent that as the stack is increased in height, the forces exerted by 56 on 57 will move the levers 58 inwardly. The operating characteristic provided by this construction is advantageous since the dead weight resistance limitations of the feeding mechanism will have no effect on the reliability of the feed and allows the stack to be made considerably higher and to vary greatly in height without affecting the operation of the machine. This also allows the operator additional time to perform other duties required in connection with the operation of the machine.

The invention also provides improved mechanism for removing the blanks from the stack individually and this mechanism comprises a suction cup 60 carried by the upper end of a reciprocating rod 61 and adapted to engage the bottom surface of the lowermost blank in the stack to draw said blank away from the stack. Rod 61 is provided with a centrally extending bore opening into the vacuum cup 60 and is slidably connected with a piston 62 positioned in cylinder 63. The piston 62 is reciprocated by rod 21 from the principal drive of the machine as explained above and is provided with a flexible washer or cup 64 for generating the required vacuum in cylinder 63 above the piston. The opening 65 provides communication between this space and the bore of rod 61. The lower end of rod 61 is counterbored and flanged and a coil spring 66 is partially received within the counterbore and engages the rear end of bore 67 in piston 62 to resiliently urge the rod 61 outwardly of the piston. An adjustable bushing 68 provides an abutment for the flange of rod 61 thereby limiting the outward movement of the rod. Bore 67, however, permits a limited relative movement between the piston and the rod.

Rotatably carried with the crank 20 is a cam 69 having a follower 70 for operating the suction relief valve 71, which valve is connected with the vacuum chamber in cylinder 63 by means of conduit 72. A manually controlled valve 71' is connected with conduit 72 and is operative to open the conduit to the atmosphere when it is desired to manually release the suction cup 60. Extending longitudinally of the machine on either side of the vacuum cup 60 is a feeding bar 73 suitably guided for longitudinal reciprocation and having on its upper surface adjacent its outer end a fixed finger 74 to engage the side edge of a blank after the same has been pulled downwardly by the vacuum cup. The construction and operation of the feeding bars 73 will be described more in detail below.

The operation of the blank separating and primary feeding assembly is as follows: With a blank resting on the levers 54, the crank 20 moves piston 62 upwardly and the vacuum cup into pressure engagement with the bottom surface of the blank. The vertical position of levers 54 is such that piston 62 continues its upward movement after movement of rod 61 has stopped, and until the flange on the latter reaches the lower portion of the bore 67. At this time piston 62 commences its downward stroke and the cup 64 creates a vacuum in cylinder 64 which is transmitted to cup 60 through opening 65 and the bore in rod 61. When the flange on rod 61 engages bushing 68, a substantial vacuum will have been formed and the cup 60 will be moved downwardly bringing the center portion of the lowermost blank with it. The bottom surface of this blank will now engage the top surfaces of the feed bars 73 and at this time the bars are moved inwardly to enable the transporting fingers 74 to engage the side edge of the blank. Immediately after fingers 74 engage the blank, the vacuum in cup 60 is broken by operation of cam 69 through valve 71. It should be noted that the fingers 74 are provided with overhanging lips to prevent the separated blank from flinging back up toward the stack. A separating cone 76 retains all but the lowest sheet in the stack.

Blank moving mechanism

Referring now to Figures 10, 11 and 12, the blank feeding bars 73 are guided for longitudinal movement in guides 77 and 78 and are moved in unison by a block 79 which is connected with outer free end of lever 23 by means of an adjustable link 80. As explained above, lever 23 is oscillated by cam 22 keyed on shaft 15. Lever 23 is pivoted on a fixed pin 81. In accordance with usual practice, each of the feeding bars 73 is provided with a multiplicity of longitudinally spaced driving fingers so positioned, shaped, and mounted as to produce a flat square contact with the side edge of the blank to move the same and to depress beneath it when returning. Heretofore, these fingers were held in the reciprocating bars by pins about which the fingers oscillated within fixed limits, each finger being provided with a light spring to hold it in its normal operating position. By reason of the limited space normally allotted to such mechanism, the supporting pins were not made sufficiently strong to withstand severe conditions of service and, consequently, frequently failed. The present invention avoids this difficulty by replacing the pins with abutment blocks 82 (Figure 12), which blocks may be cut to the desired size from a single piece machined to proper contour as one long length. The bars 73 are each provided with a series of rectangular recesses 83 each of which is adapted to receive one of the finger assemblies. As shown in Figure 12, the blocks 82 are generally square to fit within one end of the recesses 83 and are held in position by dust plates 84 which plates also limit the outward movement of the fingers. A semi-cylindrical recess 85 is provided in the block 82 and into this recess fits the semi-cylindrical surface of an integral extension 86 of the finger 87. A leaf spring 88 having its end secured to a block 89 and bearing intermediate its ends on a shoulder 90 is provided to urge the finger 87 to outer position. Block 89 and the leaf spring are retained in position by the dust plate 84. The plate 84 is provided with an opening through which finger 87 extends. The fingers 87 and springs 88 are likewise cut to the desired width from one long piece of pre-shaped stock. This procedure results in an assembly of greater strength and durability, reduces the costs of the accurate machining required, and greatly reduces the cost of assembling the bars. The parts are simply dropped into the recesses 83 and retained in position by the plates 84.

To restrain the blanks in their successive positions to which they are moved by the fingers 87, the ends of the blanks are frictionally retained by pressure strips 91 which are received within channels 92. On the opposite face of the blank ends are continuous members 93 on which the blank ends are supported. To apply resilient pressure between plates 91 and 93, semi-flattened soft hoses 94 are inserted within the flanges of channels 92 above plates 91. Side guiding strips 95 are provided to engage the ends of the blank. It should be understood that one guiding and retaining assembly as illustrated in Figure 11 is mounted on each side of the machine to engage the opposite ends of the blank being handled, each assembly being supported on a transversely adjustable member 96 and the members 96 may be simultaneously moved inwardly and outwardly by rotation of screw 97 by means of handle 98 in a manner well understood in the art. It should be apparent that the plates 91, 93 and 95 retain the blanks in the positions to which they have been moved by the fingers 87 and provide a lateral guide for the blanks. The blank moving bars 73 extend from the stack station to the cross feed station of the machine and are operative to progressively move the blanks from the stack station to and through the notching station and onto the cross feed station. Certain types of containers require the removal of the four corners of the blank preparatory to the fabrication of the cylinder and this is ordinarily accomplished by the use of a punch press of the vertical reciprocating type. The present invention provides an improved apparatus for accomplishing this operation and the apparatus is such that it may readily be incorporated in the cylinder making machine. This part of the machine will now be described.

Blank notching station

By reason of the method employed in this machine for making the side seam joint, a simpler type of notch of cut may be made at the corners of the blank which greatly simplifies the construction and operation of that part of the machine which accomplishes this function. In accordance with the invention, the cutting is accomplished by circular cutters revolving about fixed axes and the profile of which is made to correspond to the angle of the cut required. Referring now to Figure 13 which is a fragmentary plan view of a portion of the machine indicating the blank movement preparatory to the roll forming, such circular cutters are indicated by reference numeral 100 which cutters cooperate with fixed dies 101. See also Figures 14 and 15. The latter are positioned immediately below the pass plane of the stock and adjustably mounted on frame members 102. By referring to Figure 11, it will be observed that the circular cutters 100 are notched at 103 to receive the corners of the blanks and the cutting edges are, of course, positioned along the sides of the notches.

The two cutting assemblies on either side of the machine each comprise an oscillating shaft 104 on which is mounted the two circular cutters 100. This shaft is supported in capped bearings 105 supported from bracket 96 which in turn is mounted on frame 10 and is oscillated by an arm 107 keyed thereto and having pivotal and adjustable connection with a connection rod 108. Figure 14. The rods 108 are connected with the cam followers 26 and 27 (Figure 5) which in turn are actuated by the cams 24 and 25 keyed on shaft 15.

Each of the cutters 100 is mounted slidably upon a threaded bushing 109 which is provided with the shoulder 110 against which the cutter abuts and on the opposite side of the cutter is positioned a keyed washer 111 and a nut 112 which locks the cutter to the bushing. Bushing 109 is slidably secured to the shaft 104 by lock screws 113 and this assembly provides an adjustment to accommodate blanks of different lengths as well as an adjustment to compensate for wear of the cutting edges of the cutter. Likewise, the adjustable mounting of the dies 101 provide for adjustment to accommodate blanks of varying sizes and to compensate for wear.

The present invention also includes improved means to align the blanks laterally, longitudinally and angularly with respect to the notching cutters whereby the notching may be accomplished at a higher rate of speed and with greater accuracy. This is accomplished by means of the following devices. Intermediate the stack and notching station are the side guides 114' which tend to maintain the lateral and angular alignment of the blanks. A similar set of guides is positioned between the notching and cross feed stations. The blanks advance to the notching station by operation of the feeding bars 73 in the manner explained above and as the blanks enter the notching station, they are guided laterally by fixed side guides 114 (Figure 13), each of which is provided with a cam surface at its entering edge. The employment of the laterally spaced and balanced bars 73 tends also to maintain the angular alignment of the blanks. As the blanks reach the notching station, they are carried slightly past their final desired location and push back devices are employed to move the blanks back against positive gauging stops. These gauging stops, indicated generally by the reference numeral 115 in Figure 13, are shown more in detail in Figure 17. Referring to this latter figure, a block 116 is recessed in plate 93 of frame member 96, the block being provided with a dwell 117 in which is received a spring pressed dog 118 normally urged to upper position. Dog 118 is provided with an inclined front edge and a vertical rear surface 119 to engage and definitely retain the rear edge of the blank in exact position. The recesses in plates 93 are elongated, as indicated in Figure 13, to allow for longitudinal adjustment of the positions of holders 116. The dust plates 120 secure the holders 116 in adjusted position and limit the upward movement of the dogs 118. The means for moving the blanks back against the positive stops 119 comprise assemblies 121, one of which is positioned on either side of the machine. Referring to Figures 13 and 16, each assembly consists of a member 122 in which is pivotally mounted a finger 123 mounted for limited rotational movement about the pin 124. Member 122 is carried by arm 129 keyed to shaft 104. The lower end of finger 123 is provided with an inclined surface 125 to engage the edge of the blank and as member 122 is moved downwardly, upon rotation of shaft 104 it should be apparent that the surface 125 will force the blank in backward direction. An excess movement of the member 122 compresses the spring 126 which through thimble 127 urges the finger 123 against stop 128 over member 122. The positioning assembly, thus provided, accurately positions the successive blanks with respect to the cutting edges of the dies 101 and cutters 100 thereby insuring accurately located lines of cut. It should be understood that the leading edges of the blanks engage surfaces 125 of the push back fingers 123 before the shafts 104 are rotated. As shafts 104 commence their inward rotation, surfaces 125 will move the blanks into engagement with back stop surfaces 119 before the cutting edges of the cutters 100 engage the blanks. The arms 129 are longitudinally adjustable on the shafts 104 to accommodate blanks of varying lengths. It should be apparent that the positioning and cutting assembly described immediately above possesses many desirable advantages in its simplicity and economy of construction and operation. The circular cutters 100 as well as the fixed dies 101 may be economically produced and readily maintained in a highly efficient operating condition. The latter is true because the design greatly facilitates the grinding of the parts to maintain the cutting edges in sharp condition. The angles of the lines of cut are determined by the conical surface provided on the cutters 100 and are not disturbed by the subsequent grinding of the cutters.

*Cross feed mechanism*

As explained above, the blanks advance progressively from the notching station to the cross feed station and in Figure 13 of the drawings, reference numeral 53C designates the latter station while reference numeral 53B designates the former station. The initial or stack station is indicated at 53A. The purpose of the cross feed station is to grasp and move the successive blanks advancing through the machine longitudinally in a lateral direction to alternate forming roll stations positioned on either side of the machine and to accurately guide the blanks into these latter stations. Referring now to Figures 13 and 18 through 21 of the drawings, the cross feed mechanism is slidably mounted on a square rod 130 which is rigidly mounted at its ends in brackets 131 adjustably mounted on fixed frame members 132. A pair of outer flange bushings 133, having openings therethrough corresponding in contour with the outer surface of 130, are loosely fitted on the slide rod 130 and are provided with outer cylindrical surfaces to receive needle bearings 134 which are mounted adjacent the flanges. Bearings 134 rotatably mount a semi-cylindrical sleeve 135 for rotation about the center of rod 130 and sleeve 135 is provided with a generally vertical stop surface 136 and a horizontal clamping surface 137, as indicated in Figure 21.

The main body of the cross slide which is indicated by reference numeral 138 is rigidly secured to bushings 133 intermediate the bearings 134. Slide 138 is, therefore, non-rotatably but slidably mounted on rod 130 and pivoted to the slide body at 139 by means of arms 140 is an anvil 141 which extends substantially throughout the length of the slide body and co-extensive with the surfaces 136 and 137. Anvil 141 is provided with an upper clamping surface to cooperate with the clamping surface 137 of member 135 and with a vertical surface to form an abutment for stop surface 136 of member 135. Member 135 is urged in clockwise direction, as viewed in Figure 21, to normally maintain surface 136 in contact with the abutment provided on anvil 141 with the clamp opened, by a coil spring 142 through slidable thimble 143.

Referring to Figure 13, it will be observed that an additional pair of gauging back stops 115 which are identical with those shown in Figure 17 are provided at the trailing edge of the position assumed by the blank at the cross feed station. As the blank reaches the cross feed station its leading edge abuts the surface 136 thereupon rotating member 135 in a counter-clockwise direction (as viewed in Figure 21) and the edge is thus clamped between surface 137 of member 135 and anvil 141. In moving the blank into engagement with surface 136 the stock advancing fingers 87 move the trailing edge of the blank past the gauging surfaces 119, of stops 115 causing the blank to arch slightly and upon retraction of the fingers 87 the trailing edge of the blanks moves into firm engagement with the surfaces 119. At this time the blank is properly aligned and firmly clamped along a substantial extent of its principal dimension.

To move the slide to alternate roll forming stations the following mechanism is provided: Extending downwardly from the slide body 138 is a boss 144 to which is pivotally connected a lever 145, Figures 19 and 20. Lever 145 is in turn pivotally connected with a block 146 which is slidably mounted in a window 147 of lever 148, a screw 149 being provided to determine the position of the block in the window. Lever 148 is keyed to a vertically extending shaft 150 which is journaled in a frame support 151. To the lower end of shaft 150 is keyed a lever 152 which carries a cam follower 153 at its outer free end to engage the groove 32 of cam 31 to oscillate the parts upon rotation of shaft 28 in the manner explained above. It should be apparent that as the cam 31 rotates, the cross feed slide 138 and its auxiliary parts will be moved along rod 130 from one side of the machine to the other and the extent of such movement will be determined by the adjustment of screw 149.

To provide for unclamping the blank from the cross feed, after one of the two sets of forming rolls has firmly engaged the blank, the anvil 141 is pivoted for movement toward and away from the surface 137, as explained above, and an eccentric pin 153' journaled in a bearing 154 is provided to move the anvil toward and away from surface 137. A sleeve 155 surrounds pin 153' and engages a plane surface on the under side of the anvil to normally maintain the anvil in raised position even during transverse movement. Pin 153' is adapted to be rotated by an arm 156 which is keyed thereto and in turn pivotally connected with the upper end of rod 34. See Figure 18. The operation of the assembled apparatus is such that as the slide 138 approaches the end of its outward or feeding stroke, the cam 33 through rod 34 and arm 156 rotates pin 153' allowing anvil 141 to drop. This occurs shortly after the blank has been firmly engaged by the forming rolls. At this time the clamp is released but as it returns to its center position in preparation for the reception of the next succeeding blank pin 153' is rotated back to its normal position to again raise the anvil. An important advantage of the improvements in construction of the cross feeding station disclosed herein is that the blanks are accurately positioned and aligned before entering the rolls of the forming stations thereby insuring the proper operation of the latter and an accurately formed blank. Another advantage is that the edge of the blank is securely clamped throughout a substantial portion of its extent as it is fed into the forming roll pass thereby reducing substantially the probability of buckling of the blanks.

*Forming stations*

Each of the roll forming stations comprises essentially a pair of driven pinch rolls, a deflecting or bending guide, and a cylindrical guide into which the stock is propelled by the rolls. The present invention, however, provides improvements in the arrangement and construction of the various parts involved whereby the deficiency heretofore inherent in similar devices, which is to the effect that the formed blank includes a small unrolled area at the lagging edge of the blank, is obviated. This small flat area occurs where the lagging or final edge of the metal passes through the driving rolls and continues to the deflector guide. Another deficiency sought to be corrected by the present invention is the elimination of any possibility of slippage between the rolls and the stock, which slippage may result in skewing of the blank and stoppage of the machine. Slippage occurs due to unevenness in the thickness of the stock and is not satisfactorily avoided by having one rolled spring mounted and both rolls accurately sized for concentricity and parallelism.

Referring now to Figures 13, 18 and 20 of the drawings, reference numeral 158 designates a cylindrical form about which the rolled blank is encompassed. Journaled in the form member 158 is the lower forming roll 159 whose axis is so chosen that the outer surface of the roll is tangent to the periphery of the outside surface of the member 158. A second forming roll 160 is journaled in suitable bearing blocks 161 fixed to the machine frame outside of the member 158. Rolls 159 and 160 are driven by a motor 162 mounted on the bracket 163 positioned above the forming station, the motor being connected through drive 164 keyed onto the end of the roll shafts. Immediately in back of the rolls 159 and 160 is a deflecting plate 167 which is adjustably mounted at 168 and is provided with a knife edge to receive the stock as the same issues through the roll pass to thereby bend the stock downwardly. A guide 169 is positioned above the path of travel of the stock immediately in front of the pinch roll pass.

As shown in Figure 18, the cylindrical form 158 is flattened along the chord 170 to provide for the mounting of roll 159 and supported on the chord to one side of the roll is a block 171 having an outer surface coincident with the periphery of form 158 and a tongue 172 which is adapted to be received in an annular recess 173 (Figure 22) of the roll 159. This construction eliminates the possibility of the blank rolling too sharply and becoming encompassed about the bending roll 159. Positioned on the chordal plane 170 on the opposite side of roll 159 is a second block 174 provided with a stop 175 to engage the advancing edge of the blank as it passes about the form 158.

The axes of rolls 159 and 160 lie in a common vertical plane which is spaced outwardly of the vertical plane including the principal axis of the cylindrical form 158. This construction, it is found, eliminates the small unrolled or uncurved area adjacent the lagging edge of the blank since the deflecting surface of member 167 is coincident with the cylindrical curve of the form 158 and has its leading edge closely adjacent the pass between the rolls 159 and 160. This arrangement is not practical without the offset since then the leading edge of member 167 would possess insufficient strength to deflect or bend the blanks. When the rolls 159 and 160 receive the near edge of the advancing blank, the blank is driven at greatly increased speed under the bevelled edge of the blade 167 and about the form 158. The momentum imparted to the blank moves the advancing edge thereof into engagement with stop 175 in which position of the blank, the lagging edge thereof is entirely free of the rolls.

Pivoted at 176 for rotation about an axis parallel with the principal axis of cylinder 158 are the guide wings 177 and 178, one positioned on either side of the form 158, provided with curved surfaces to overlie the periphery of form 158 thereby insuring that the blanks will have sliding contact with the form. The guide wings are held inwardly by spring pressed thimbles 179 which engage the wings intermediate their tops and bottoms. The wings with their resilient mounting serve as a precaution against blanks being passed through the forming stations with an improper curve and allow for expansion of the restraining surfaces in the event that the blank becames buckled. Each of the wings 177 and 178 is provided with two circumferentially spaced but axially extending recesses 180 adapted to slidably receive the carrier bars 181. As indicated in Figure 18, the recesses 180 extend radially outward from the inner curved blank guiding surfaces of the wings 177 and 178 and when the parts are assembled, the inner surfaces of the carrier bars 181 coincide substantially with the curve of the blank. Bars 181 each have retractable blank moving fingers 182 (Figure 23) and shallow slots 183 in the outer surface of cylindrical form 158 are provided to accommodate the outer edges of the fingers. The carrier bars 181 are provided to transport the rolled blanks from the forming stations to the welding stations in a manner to be hereinafter described.

One of the driving rolls, preferably 160, is preferably constructed by employing a soft oil-proof cylindrical cushion 184 about the shaft 185 (Figure 22) and covering the cushion with a metal casing 186. This construction permits the roll to firmly contact the surfaces of the blanks regardless of variations in their thickness and thereby prevents slippage between the rolls and the blanks. Consequently, the blanks are driven into the cylindrical confining space between form 158 and the guiding wings 177 and 178 in even and properly aligned relation.

*Welding stations—Current conductive transporting horns*

Longitudinally aligned with each of the cylindrical forms 158 is a current conducting blank transporting and welding horn 188 which is carried by the fixed frame of the machine and in rigid alignment therewith by the transversely extending carrier bar 189 which is insulated with respect to the frame of the machine. Figures 22, 23 and 24. A finger bar and body guide 190 loosely embraces the horn 188 and is supported from the frame 10. As indicated in Figure 23, guide 190 is provided with longitudinally extending recesses to receive the carrier bars 181 and the looseness of the guide permits the pre-formed blanks to travel over the horn and within the guide longitudinally. Bars 181 are secured to a sleeve 192 which is oscillated by an adjustable lever 193 from arm 48. It should be understood that the circumferentially spaced bars 181 extend from about the form 158 to about the horn 188 to the vicinity of the welding station and thus provide a carriage for moving the pre-formed blanks to the welding station upon oscillation of arm 48. Cylindrical form 158 is larger in diameter than the diameter of the completed cylindrical body being produced so that as the blank leaves the form and passes onto the conducting horn 188, the cleft edges of the blank are spaced apart, and integral with the horn 188 is an upwardly extending longitudinal web 194 which aligns the formed blank angularly on the horn during movement of the blank by engaging the cleft edges of the blank. Incidentally, the web 194 provides a means of supporting the horn. Extending upwardly from one end of the web 194 is a terminal 195 to which one terminal of the welding transformer or other welding current supply is adapted to be connected. Extending laterally outward from either side of terminal 195 is a wing 196 on the lower surface of which is adapted to be secured a wiping device, not shown, to cooperate with a wiping device supported on the horn itself to clean both the inner and outer surfaces of the stock adjacent both cleft edges.

The outer or welding end of horn 188 is provided with a laterally slidable gauging segment 197 (Figure 24) which is operative to expand the blank outwardly to accurately size the inner diameter of the blank at the welding station. A pair of spaced squared cam followers 198, received in aligned recesses in the body and segmental portion 197 of horn 188 and bearing against the inner ends of screws 199 (Figures 24 and 25) screw-threadedly received in the segment 197, are adapted to move the segment 197 laterally outward. Followers 198 are arranged to be operated by machined cam surfaces on rod 200 which is slidably received in a longitudinal bore provided in horn 188. Referring to Figure 22, rod 200 is operated by a pivoted arm 201 through connecting rod 46 from cam 45. The operation of this mechanism is such that after a particular blank has assumed its proper position at the welding station, cam 45 acts to expand the horn at the welding station by moving gauging segment 197 outwardly to insure the proper diameter of the completed cylindrical object. Segment 197 is substantially co-extensive in length with the body being produced. As the formed blank passes from the cylindrical form 158 onto the horn 188, the inwardly directed edges of the blank pass on opposite sides of the lever 201 which is flattened. In addition to the features specifically described, the horn is constructed with passages to permit cooling water to freely flow to and away from its extremity at the welding station and the inlet and outlet for such passages also extend through the web 194. A welding spline 202 is assembled to the horn at the welding zone and a wearing segment 203 is secured to the horn at a point diametrically opposite the spline 202.

Welding station—Stock clamp

Associated with the horn 188 at the welding station is a compound clamping assembly which is operative to first clamp the blank to the horn at a point diametrically opposite the welding zone to prevent angular misalignment of the blank relative to the horn and welding zone, to overlap the edges of the blank, and thereafter to securely clamp the stock against the expanded sizing horn preparatory to the actual welding operation. For this purpose a clamp bar 204 (Figure 22) is positioned opposite the segment 203, being adapted to engage the outer surface of the blank and on either side of the bar 204 is a clamping wing 205 which is accurately machined on its inner surface to accurately embrace the expanded welding horn with the blank body therebetween. Wings 205 are pivoted on a pin 206 which extends exactly parallel with and below the line of weld, the pin being journaled in a support 207 extending upwardly from the base 10. One of the wings is keyed to pin 206 to rotate the same and also keyed to pin 206 is an eccentric 208 which forces bar 204 upwardly upon rotation of pin 206 as represented by an initial movement in a closing direction of the said one of the clamping wings. Each clamping wing is operated by a toggle 209 operated by a cam follower 210 bearing against one or the other of the cams 49, 50. The two cams 49 and 50 are identical but are angularly spaced so that one of the wings 205 will close before the other of the wings. This arrangement insures that one of the blank edges will be deposited on the welding spline 202 (Figure 24) before the other of the edges is brought into position thereby insuring the proper overlapping of the edges preparatory to the welding operation. Obviously, the first wing to move during the clamping operation rotates the pin 206 and the construction of cam 208 is such that the blank is rigidly clamped between 203 and 204 before the first wing progresses any appreciable distance along its path of movement. Upon completion of the welding operation, the clamps 204 and 205 move away and the carrier bars 181 force the completed cylindrical body off the end of the welding horn and along the conveyors 211.

Welding stations—equipment

An important part of the present invention is the improved features of construction of a semi-continuous seam welding mechanism which is capable of such regulation and control in all of its critical phases that the welding of thin-gauged stock normally employed in making cans may be satisfactorily accomplished at high rate of speed. Heretofore, seam welding has been accomplished either by passing the work progressively between the welding electrodes or moving the electrodes in relation to the work and either of these methods requires a reciprocating action of comparatively heavy mechanism. At high speeds the forces thus developed introduce definite tendencies toward inaccurate results and a very brief life of the mechanism involved. The present invention overcomes this disadvantage by eliminating the need for any reciprocating parts in the electric welder assembly. This is accomplished by employing a plurality of circumferentially spaced welding wheels which are mounted for orbital movement about an axis parallel with the axes of rotation of the individual wheels. The entire assembly which is of substantial mass is arranged to be continuously rotated in the same direction and properly correlated in position and speed with the means employed to convey the pre-formed blanks to the welding station so that one of the wheels will traverse the overlapped edges of the blank immediately upon the blank being positioned at the welding station, while the intervals between the succeeding wheels provide "off" times during which the completed product may be removed from the welding station and a new blank brought into position. The invention also involves various other novel features of construction which will become apparent from the following description of a preferred embodiment of the welding apparatus.

Referring to Figures 22, 26, 27 and 28 reference numeral 213 indicates a driving block which is keyed to a shaft 214 journaled in a conductive bearing 215. Bearing 215 encompasses a current carrying bushing 216 which extends outwardly of the bearing 215 and into the hub of the current carrying disk 217. The other terminal of the welding transformer secondary or other source of welding current is adapted to be connected with the bearing 215.

A disk 218 extends radially outward from one end of block 213 and a second disk 219 extends radially of the other end of the block 213. See Figure 26. Intermediate the two last mentioned disks are a plurality of radially extending but circumferentially spaced hollow studs 220, each of which carries a piston 221 at its outer end, and the openings through the studs 220 cooperate with a central bore 222 in shaft 214 to provide passages for air under pressure to the outer sides of pistons 221.

Positioned intermediate the disks 218 and 219 are a plurality of welding wheel supporting blocks 223 which are guided longitudinally by the disks and circumferentially by the guiding surfaces 224 and 225 provided by notching the disks 218 and 219. Each of the blocks 223 is provided with a bore into which is forced a sleeve 226 to constitute a cylinder for one of the pistons 221. Any number of welding wheel assemblies may be employed, depending on the size and desired capacity of the machine but in the embodiment specifically disclosed, eight such wheels are employed. Blocks 223 are provided with capped bearings 227 and 228 to journal shafts 229 which carry the welding wheels 230. Extensions 231 are secured to blocks 223 and flexible conductors 232 connect the disk 217 with the blocks 223 to provide for the conduction of welding current to the individual welding wheels.

In the embodiment of the invention specifically disclosed, there are two welding wheel assemblies 213—232, one on either side of the machine to cooperate with each of the two forming stations and these assemblies are both driven from a common drive positioned therebetween. This drive consists of two shafts 233, one for each assembly, suitably journaled, and to these shafts 233 is keyed a single worm wheel 234 meshing with the worm 40 which, as explained above, is driven by chain 38 from main shaft 12. Figure 5. The outer ends of shafts 233 have flanges 235 to the outer periphery of which are attached rings 236 of insulating material. Rings 236 are in turn frictionally retained with respect to the disks 219 by the clamping rings 237, which are secured to the disks 219. Thus, an insulated drive is provided for each of the two welding wheel assemblies.

When air is supplied to the passage 22, each of the carrier blocks 223 is urged outwardly by the air pressure existent in the cylinders 226 radially outward of the pistons 221. Outward movement of the carrier blocks, however, is limited by a continuous track 238 (Figures 1 and 26) against which a roller 239 carried by each of the blocks 223 is adapted to abut. The track is of such contour, however, that as the welding wheels 230 reach the welding spline 202 outwardly of the end of the seam to be welded, the rolls 239 are lifted from the track by reason of the engagement of the wheels 230 with 202 and upon the traverse of the seam, the full pressure of the air within the cylinder 226 is operative for applying the welding pressure. Thus the welding pressure may be readily varied by controlling the air pressure in bore 222. It is found that the welding pressure applied is substantially constant throughout the entire traverse of the seam since the substantial interval between the axis of supporting shaft 214 and the working surface of spline 202 results in but limited and relatively slow inward movement of the blocks 223 thereby allowing the slight increase in air pressure to be dissipated throughout the substantial spaces of the air system. It should be also observed that the supporting axis of shaft 214 is positioned centrally above the spline 202 (Figure 22) and this together with the relatively short length of the spline as compared with the interval between the working face of the spline and the said axis results in but a small inconsequential variation in the welding speed as the welding wheel traverses the spline.

To provide for cleaning and sizing the wheel electrodes 230 during their orbital movement and between their successive uses at the welding station, a sizing bar 271 (Figures 1, 2 and 3) is provided for each of the rotary assemblies, being mounted on the machine in position to be engaged by the electrodes. Bar 271 is constructed with a longitudinally extending groove 272 having a transverse outline identical with that desired on the periphery of the electrodes. The electrodes move into the grooves during their orbital movement and when contact is made the rollers 239 leave track 238 allowing the pressure exerted by cylinders 226 to hold the electrodes in pressure engagement with the sizing bars. In practice, the bars 271 are made sufficiently long to insure such engagement for the entire circumferential extent of each electrode. In this manner the proper transverse contour of the welding wheel peripheries is maintained.

Referring now to Figures 27, 28 and 29 which show the air and water connections for the electrode wheel assembly, a distributor 241 is screwed into the bore 222 of shaft 214, the distributor being provided with a flange 242 to over-lie the end of the shaft 214. Assembled outwardly of the bearing 215 is a housing 243 having a capped end 244 and a bore to receive a cylindrical portion of the distributor 241. The latter is provided with a center bore 245 which is opened to the space in 244, the latter being connected with an air supply conduit 246. Member 241 is provided with two other longitudinally extending passages 247 and 248 which communicate with annular distributor recesses 249 and 250, respectively, formed in the bore of 243. The first recess is in communication with a water supply port 251 and the latter with water return port 252.

At the opposite end of distributor 246 a conduit 253 communicates with passage 247 and a return conduit 254 communicates with passage 248. By referring to Figure 29, it will be evident that the water or other cooling fluid coming through conduit 253 passes through the various welding wheel journals 229 (Figure 28) in series and passes out of the system through conduit 254.

Referring to Figure 28, the supporting shaft 229 of welding wheel 230 is provided with a bore 255 into which extends a tube 256. The latter is held at its outer end by a fitting 252' which is carried by member 258 attached to the block 223 of the electrode assembly. The outer end of 256 is in communication with fluid supply conduit 253 and thus provides means to conduct water into the body of the holder 229. The fluid is returned through bore 255 to the space within the member 258 and from thence passes into the conduit 259 which conducts the fluid to the next succeeding welding wheel assembly. A bellows 260 is housed within member 258 and has a soft metal end ferrule 261 which resiliently engages the end of the revolving carrier 229. The fluid flowing through the system tends to expand the bellows thereby urging ferrule 261 into engagement with 229 to maintain a sufficient seal to prevent leakage.

Associated with each of the multiple wheel welder assemblies is a transformer 262 for supplying the welding current and the transformer is conveniently supported on a bracket 263 carried by the machine frame. One terminal of the transformer secondary is connected to bearing 215 as explained above and the other terminal is connected to the current conductive transporting and welding horn 188 through bus bar 264. Figure 29 shows the manner in which the cooling fluid is conducted to and through the horn 188.

To successfully adapt the resistance welding method to the high speed manufacture of cylindrical bodies of thin-gauge stock such as is used in can making, for example, considerable change from prior practice must be effected in the various operating factors involved. These factors, which include the frequency, voltage and power rating of the welding current source, the welding speeds and pressure, and the welding throat area employed, must all be very accurately coordinated if uniform and satisfactory welds are to be produced in the bodies. The welds must be of sufficient density for proper strength and to avoid leakage in the seam but must not be of such character that the metal of the blank is burnt or otherwise unduly damaged. These requirements are met by the present invention principally by the use of a current source of considerably higher frequency than that heretofore employed in seam welding and by the use of a welding assembly which represents a minimum welding throat area for the proper confinement of the welding current. This latter result is achieved principally by the use of the small electrode wheels which by reason of their small diameter present a minimum of surface to the blank. The design of the apparatus is such that the welding pressure exerted by the individual moving electrodes may be readily controlled and adjusted and when the proper welding speed is once determined by selection of the drive, the same is automatically maintained during the operation of the machine.

While any suitable system may be employed to control the flow of welding current to the respective electrodes it is desirable that the control function in such manner that the current is turned on after an electrode comes into pressure contact with the spline 202 but before the electrode reaches the blank and that the current is turned off after the electrode leaves the blank but before the pressure between the electrode and the spline is appreciably reduced. The dimensions of the welding horn and spline are so chosen for any particular length of seam that the above mode of operation can be followed.

It should now be apparent that we have provided an improved apparatus for automatically producing cylindrical sheet metal bodies at high rates of speed direct from the flat stock which accomplishes the objects initially set out. By practice of the invention, it is possible to successfully combine in a single machine automatic means for feeding, notching, gauging, cleaning, sizing and electric welding. The improvements in the various feeding mechanisms involved contribute to the reliability of the machine and the improved construction of the notching mechanism enables the notching operation to be accomplished more accurately and with less power and facilitates the maintenance of the cutting tools. By making suitable changes in various parts of the machine as, for example, in the forming apparatus and welding horn, other forms of bodies as rectangular, square, polygonal, or oval may be successively welded at high productive speeds.

An improved product is obtained as a result of the improvements in the forming stations which improvements eliminate the flat or unrolled areas heretofore encountered in forming apparatus for comparable purposes. Also substantial advantages and improved results flow from the described improvements in the welding mechanism employed but principally from the novel method of supporting the wheel electrodes and moving the same relative to the work.

The above specifically described embodiment of the invention should be considered as illustrative only as obviously many changes may be made therein without departing from the spirit or scope of the invention. The invention is considered to reside in the general combination of the machine as well as in improvements in the various features of construction and arrangement of component and sub-component parts thereof. Reference should therefore be had to the appended claims in determining the scope of the invention.

We claim:

1. Welding apparatus comprising in combination a normally fixed electrically conductive horn adapted to support a pre-formed blank to be welded and to constitute one of the welding electrodes, a rotatable carrier mounted for rotation about an axis extending at right angles to but spaced substantially outward from the principal axis of the horn, said carrier supporting a plurality of welding wheel electrodes circumferentially disposed about the axis of rotation of said carrier with each of said wheel electrodes adapted to traverse a portion of the blank on said horn, and means to conduct welding current to said welding wheel electrodes.

2. Apparatus according to claim 1 further characterized in that said wheel electrodes are individually mounted on said carrier, and resilient means to individually urge said wheel electrodes radially outward of said carrier.

3. Welding apparatus comprising in combination a normally fixed electrode adapted to support metal objects to be welded, a movable electrode assembly comprising a hub mounted for rotation about a normally fixed axis, a plurality of radially extending but circumferentially spaced welding electrode wheel supports carried by said hub, a welding wheel electrode journaled in each of said supports for rotation about its principal axis, means to conduct welding current to said wheels and means to rotate said hub about its principal axis.

4. Apparatus according to claim 3 further including a fluid pressure filled expansive member intermediate each of said welding wheels and said hub, and means to supply fluid pressure to said members whereby said welding wheels are individually urged to radial outward position for the application of the welding pressure when the wheels traverse said fixed electrode.

5. Apparatus according to claim 3 further including means to urge said supports radially outward of said hub whereby welding pressure may be applied when the welding wheels traverse said fixed electrode, and means engaging said supports along an orbital path to restrain the outward movement of said supports when the welding wheels carried thereby are off said fixed electrode.

6. Welding apparatus comprising in combination a normally fixed electrode adapted to support objects to be welded, a movable electrode assembly comprising a rotatably mounted hub and a plurality of radially extending but circumferentially spaced hollow studs secured thereto, spaced guides carried by said hub on either side of said studs, a piston on each of said studs, a welding wheel electrode support associated with each of said studs and having a cylinder adapted to receive the piston on the stud, said guides being operative to guide said supports for radial movement, a welding wheel electrode journaled in each of said supports, the arrangement of the parts being such that said wheels are adapted to traverse said fixed electrode during a portion of their orbital movement, means comprising the passages through said studs to conduct fluid pressure to said cylinders and thus apply welding pressure between said electrodes, and means to conduct welding current to said electrodes.

7. Apparatus according to claim 6 further including a shaft supporting said hub, an electrically conductive bearing, an electrically conductive bushing intermediate said bearing and said shaft and adapted to rotate with said shaft, said bushing extending outwardly of said bearing, an electrically conductive member having radially extending portions connected with said bushing and adapted to rotate therewith, and flexible current conductors interconnecting the outer portions of said electrically conductive member and said electrode wheel supporting members.

8. Welding apparatus according to claim 6 further including a shaft for the rotatable support of said hub, and a passage through said shaft for communicating with the passages through said studs to conduct fluid pressure to said cylinders.

9. Apparatus according to claim 6 further characterized in that each of the said welding electrode wheels comprises a disk secured to a rotatable shaft journaled in said supports, said shafts being provided with an axially extending bore opened at one end of said shaft, a fitting secured to said member adjacent the open end of said bore, a water tube carried by said fitting and projecting into said bore, a return water collecting chamber in said fitting, a seal in said chamber engaging the adjacent end of said shaft, an inlet to said tube and an outlet from said chamber, a rotatable shaft supporting said hub, and means comprising said shaft to conduct cooling water to said inlet and away from said outlet.

10. Welding apparatus comprising in combination a current conductive horn having a discontinuous cylinder surface adjacent its one end and a continuous cylinder surface at its other end, means supporting said horn adjacent said first mentioned end, a guide encircling the major portion of said horn intermediate its ends, and a plurality of longitudinally extending but circumferentially spaced stock moving bars slidably mounted in said guide and extending generally parallel with the principal axis of said horn, and a movable wheel electrode arranged to traverse longitudinally said continuous surface.

11. Apparatus according to claim 10 further including means to mount said wheel electrode for rotation about its own axis and about an axis further removed from said horn, means to apply pressure between said wheel and said horn during the traverse of said wheel, and means to conduct welding current to said wheel electrode.

12. Welding apparatus comprising in combination a fixed electrode, a normally movable electrode comprising a conductive wheel, means mounting said wheel for rotation about its own axis and about an axis further removed from said fixed electrode, means normally urging said wheel radially outward of said second mentioned axis whereby welding pressure will be applied as the wheel traverses said fixed electrode, and a guide extending along an orbital path to restrain said radially outward movement of said wheel along said path outwardly of said length of traverse.

13. Apparatus according to claim 12 further characterized in that said mounting means comprises a rotatable carrier having a radially outward extending guiding surface, said wheel being journaled in a block slidably gauging said last mentioned surface, said restraining means comprising a track extending along said orbital path and a roller journaled on said block and engaging the inside surface of said track.

14. Welding apparatus comprising in combination a rotatable carrier, a multiplicity of wheel electrodes circumferentially arranged about the periphery of said carrier and mounted on said carrier for rotation about their own axes as well as the axis of said carrier, and means to rotate said carrier comprising a motor driven wheel positioned adjacent to but spaced from one of the faces of said carrier and mounted for rotation about an axis co-incidental with the axis of rotation of said carrier, and an insulating friction member between said carrier and said motor driven wheel.

15. Welding apparatus comprising in combination a pair of spaced axially aligned bearings, a shaft rotatably mounted in each of said bearings and extending inwardly toward each other, a wheel electrode carrier mounted on the inner end of each of said shafts, each of said carriers supporting a plurality of circumferentially spaced wheel electrodes adjacent its periphery, said wheel electrodes being mounted for rotation about their own individual axes, and means to rotate said carriers comprising a shaft journaled between the carriers and having drive connection with each of said carriers, a worm wheel keyed on said shaft intermediate the carriers, and a motor driven worm in mesh with said worm wheel.

16. Apparatus according to claim 15 further characterized in that the said drive connections between the carriers and the shaft positioned therebetween comprise a resilient electrical insulating friction member interposed between the carriers and the adjacent ends of said shaft.

17. Welding apparatus comprising in combination a current conductive bearing, a current conductive sleeve journaled in said bearing, a shaft in said sleeve and rotatable therewith, a wheel electrode carrier mounted on said shaft and having means adjacent it periphery to individually mount a plurality of circumferentially spaced wheel electrodes for rotation about their individual axes, said wheel electrodes being arranged for individual radial movement, and means to conduct welding current to said wheel electrodes comprising a conductive member keyed on said sleeve, and flexible current carrying members interconnecting said last mentioned conductive member and said wheel electrodes.

18. Apparatus according to claim 17 in which said means mounting said individual wheel electrodes on said carrier comprise a block for each of said wheel electrodes slidably mounted for radial movement on said carrier, a fluid pressure motor associated with each of said blocks and adapted to urge said blocks radially outward, and means to conduct fluid pressure to said motors comprising a bore in said shaft, and conduits interconnecting each of the motors with said bore.

19. Welding apparatus comprising in combination a rotatable carrier having means adjacent its periphery to rotatably support a plurality of circumferentially spaced wheel electrodes, said electrodes being rotatable about their own individual axes as well as the axis of said carrier, each of said electrodes comprising a hollow shaft having a hub portion and a conductive disk secured to said hub portion, and means to conduct cooling fluid for circulation through said hollow shafts comprising a shaft rotatably supporting said carrier, longitudinally extending passages through said last mentioned shaft for the ingress and egress of cooling fluid, means to connect the inner end of one of said passages with the space within one of said hollow shafts, means to connect the spaces in said hollow shafts in series circumferentially about said carrier, and means to connect the outlet of the space of the last hollow shaft in said series with the inner end of the other of said passages.

STANLEY M. HUMPHREY.
CLIFFORD S. SELTZER.